United States Patent
Fox et al.

[11] Patent Number: 5,823,618
[45] Date of Patent: Oct. 20, 1998

[54] ANATOMICALLY COMPENSATING SIZE VARYING AND ADJUSTABLE SHOCK ABSORBING SPLIT BICYCLE SEAT

[76] Inventors: Harry M. Fox; Joyce L. Fox, both of 14130 Mulholland Dr., Beverly Hills, Calif. 90210

[21] Appl. No.: 806,041

[22] Filed: Feb. 1, 1997

Related U.S. Application Data

[60] Provisional application No. 60/009,587 Feb. 4, 1996.

[51] Int. Cl.$^6$ ........................................ B62J 1/06
[52] U.S. Cl. ...................... 297/201; 297/202; 297/214; 297/215.13; 297/215.15; 297/209; 297/198; 297/452.51; 297/452.53; 297/195.1
[58] Field of Search ....................... 297/201, 202, 297/214, 215.15, 215.13, 209, 198, 452.51, 452.53, 452.22, 195.1

[56] References Cited

U.S. PATENT DOCUMENTS

| | | | |
|---|---|---|---|
| 560,698 | 5/1896 | Dyer | 297/201 |
| 568,626 | 9/1896 | Pierce | 297/201 X |
| 576,070 | 1/1897 | Deitzler | 297/201 X |
| 593,331 | 11/1897 | Noirit | 297/201 |
| 604,347 | 5/1898 | Bray | 297/201 |
| 608,089 | 7/1898 | Wellmann | 297/201 X |
| 608,682 | 8/1898 | Jamieson | 297/201 |
| 619,204 | 2/1899 | Moore | 297/201 |
| 622,357 | 4/1899 | Hilehcock et al. | 297/201 |
| 629,956 | 8/1899 | Craig | 297/201 |
| 635,598 | 10/1899 | Rowe | 297/201 |
| 1,623,818 | 4/1927 | Tichota | 297/201 X |
| 3,997,214 | 12/1976 | Jacobs | 297/202 X |
| 4,218,090 | 8/1980 | Hoffacker et al. | 297/202 X |
| 4,387,925 | 6/1983 | Harker et al. | 297/201 |
| 4,877,286 | 10/1989 | Hobson et al. | 292/201 X |
| 5,286,082 | 2/1994 | Hanson | 297/201 |
| 5,348,369 | 9/1994 | Yu | 297/214 |

FOREIGN PATENT DOCUMENTS

| | | | |
|---|---|---|---|
| 14766 | 7/1911 | Denmark | 297/211 |
| 91016 | 10/1983 | European Pat. Off. | 297/201 |
| 358585 | 2/1906 | France | 297/201 |
| 360232 | 5/1920 | France | 297/201 |
| 114135 | 4/1899 | Germany | 297/201 |
| 9821 | 5/1890 | United Kingdom | 297/201 |
| 21038 | 11/1895 | United Kingdom | 297/201 |
| 18055 | 8/1896 | United Kingdom | 297/201 |
| 6153 | 3/1897 | United Kingdom | 297/201 |
| 314628 | 7/1929 | United Kingdom | 297/209 |
| 2121740 | 1/1984 | United Kingdom | 297/201 |
| 3011025 | 6/1993 | WIPO | 297/201 |

*Primary Examiner*—Peter M. Cuomo
*Assistant Examiner*—Rodney B. White
*Attorney, Agent, or Firm*—Roger A. Marrs

[57] ABSTRACT

A pedestal seat having an adjustable base for supporting a first resilient suspension system for a pair of separate and spaced-apart cushioned body halves adapted for independent articulation with respect to each other is disclosed. A second resilient suspension system is disposed in each of the of the respective body halves adapted to bear against skeleton contact points of the user's torso. The first suspension system employs a pair of leaf springs having opposite ends attached to each of the respective body halves with a coil spring interconnecting one end of each leaf spring with a selected end of each body half. The adjustable base releasably secures the midsection of each leaf spring to a common pedestal or stanchion. The second suspension system includes several helical springs arranged in parallel relationship in each body half occupying a pocket area within a surrounding cushion so that the cushions of the body halves cooperate to provide comfort and shock absorbing capabilities in combination with the first suspension system.

6 Claims, 2 Drawing Sheets

ANATOMICALLY COMPENSATING SIZE VARYING AND ADJUSTABLE SHOCK ABSORBING SPLIT BICYCLE SEAT

Priority is claimed based on Provisional Patent Application of same title, filed Feb. 4, 1996, having Ser. No. 60-009,587.

BACKGROUND OF THE INVENTION

1. Field of the Invention

The present invention relates to a composite spring support for seats, and more particularly to a novel seat suspension arrangement having a first and a second resilient suspension means providing necessary impact in shock absorption as well as constructing the seat in two halves allowing independent movement of each seat half to either rise or lower as required by up/down motion of the user's legs.

2. Description of the Prior Art

In a conventional seat for supporting a person engaging in an activity such as bicycling or the like, it is believed that groin soreness and general discomfort is caused by the constant vibration and pressure point of body weight and road impact. A conventional seat, such as employed on a bicycle, does not absorb enough vibration and does not offer impact resistance protection in spite of the use of soft foam-covered cushioned seats and/or the use of coil springs. Furthermore, conventional seats are fixed and rigid lacking adjustment capaability for individual requirements of the user. Attention is directed to the fact that the user's body contact with a conventional seat typically changes during use such that not only with a person's body shape and size, but alternating leg movements and pedalling cause differing body point contact requirements with the seat. Furthermore, the user's soreness and pedalling efficiency are caused by conventional seats not yielding to the different and changing body shape, size, weight and leg position functions.

Some attempts have been made to provide seats which provide shock absorbing features as well as minor adjustment, for example, fore and aft rotation about a lateral axis. However, problems and difficulties have been encountered with such conventional systems and such seat arrangements are disclosed in U.S. Pat. Nos. 5,308,140; 5,348,369; 5,368,358; 5,385,705 and 5,286,082. Such disclosures provide attempts to improve the shock absorbing features; however, such features are not solved by the conventional attempts since major problems still exist relating to (1) adjusting to the user's body varying motion; (2) reducing shock and fully adjustable; (3) adapted to fit different user body sizes, weights and shapes. Although the disclosure in U.S. Pat. No. 5,286,082 discloses an attempt to compensate for pedalling motions by positioning the seat, the problem still exists in establishing a means which relates to skeleton structure-to-seat structure. Problems and movements relating to skeleton structure and seat structure should have a related seat movement so that such movement is a compliment with respect to each other. Since the skeleton varies, the seat must also vary and stillsupport the skeleton at the proper locations. Existing seats support at different contact points.

Therefore, a long-standing need has existed to provide a seat for use such as with bicycles or exercise equipment which will readily adjust to correct contact and which will provide for the proper shock absorbing features at these points to that the seat can support the body at the muscle contact. Assurance must be provided that the seat does not impede the ability of leg movement. Even slight wrongful contact or stiff resistance of the seat will lessen pedalling efficiency.

SUMMARY OF THE INVENTION

Accordingly, the above problems and difficulties are avoided by the present invention which provides a novel fully articulated seat for use with sport activities, such as the riding of a bicycle, utilizing an exercise machine or the like. The seat of the present invention employs an elongated body of cushion material comprised of two separate and individual halves that are arranged side-by-side in spaced-apart relationship so as to permit independent action during use. A first suspension system is provided for supporting the body halves in the above relationship which includes resilient means, such as a leaf spring and coil combination extending between the opposite ends of each of the respective seat halves. Adjustment means are provided for mounting the first resilient suspension system onto the end of a pedestal or stanchion. A second suspension system is carried in the cushion or padding of the respective seat body halves and is employed in combination with the first suspension system to absorb shocks and road impact forces. Furthermore, the second suspension system is critically located so as to contact with certain hip and leg joint bony projections of the user's torso so that both the body halves readily transfer road impact and vibrations to the lower user body parts. In one form of the invention, the first resilient suspension system includes an elongated leaf spring having its opposite ends attached to the opposite ends of a respective body half of the seat. At one end, a coil spring interfaces between the coil end of the leaf spring and the body half and the coil spring is made laterally adjustable to accommodate widening or narrowing the separation between the two halves. The opposite end of the leaf spring is connected to a scissor adjustment for further accommodating widening or narrowing of the separation between the halves. The second suspension system includes a plurality of helical springs included within surrounded padding and situated in a pocket area between additional cushion material. The pocket area is disposed critically to bear against the contact points of the user's body requiring fit and protection, as well as accommodation for independent up and down motion as the user engages in the exercise or bicycling procedure. Clamp means are employed for releasably and adjustably attaching the first suspension system to the top of a stanchion or pedestal and permits the seat body halves to be moved fore or aft of the pedestal center line.

Therefore, it is among the primary objects of the present invention to provide a novel seat having a first and second suspension system for shock absorbing purposes while the seat is being used in a sport or exercise practice.

Another object of the present invention is to provide a novel seat which will readily adjust for the body size of the user and which is anatomically compensating so as to provide comfort, appearance and safety.

Still a further object of the present invention is to provide a resilient suspension system for a seat which combines the positive effects of a leaf spring and a coil spring combination and which further includes a helical spring suspension so that adjustability is provided for body and position of the user on the seat as well as body weight adjustability and adjusted shock absorbing ability.

A further object of the present invention relates to a novel seat which is a two-part seat that reduces inhibiting contact at critical contact points between the user and the seat wherein the seat articulates or moves with motion rather than offering resistance.

A further object resides in providing a novel seat which splits or divides load forces that follow body functions independently so as to compensate for opposing leg motion during the movement of legs up and down, such as on a bicycle or exercise machine.

Yet a further object resides in providing a seat support structure which is flexible, especially at critical body seat support contact.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
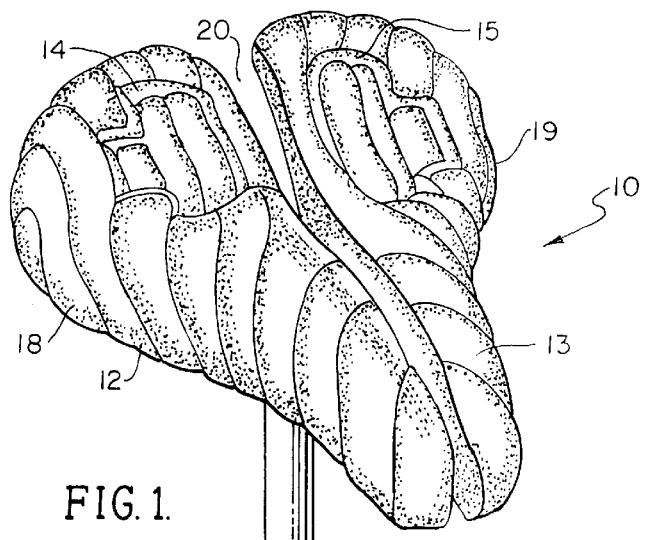
FIG. 1 is a front perspective view of the novel anatomically compensating seat employing the present invention.

Referring to FIG. 1, the novel seat incorporating the present invention is illustrated in the general direction of arrow 10 which is illustrated as being mounted on the end of a pedestal or stanchion 11. The seat 10 includes seat body portions 12 and 13 which are covered with a soft cushion material and wherein the material is gathered and sewn to form a plurality of cushion areas separated by stitching or other sewing techniques. The seat includes a forward end which is narrow and a back or rear end which is substantially wider and the cushion arrangement at the back end of the seat forms a circle defining a toroid or a pocket area, identified by the numeral 14 on one side of the seat and numeral 15 on the other side of the seat. The pockets 14 and 15 are occupied by a suspension system (to be described later) wherein the system is covered by cushion material.

It is to be particularly noted that the seat 10 comprises a pair of cushioned body halves or portions, identified by numerals 18 and 19 respectively. The body halves or portions are longitudinal and are arranged in spaced-apart relationship running generally parallel with respect to each other. A substantial space or gap is defined between the opposing side edges of the body portions 18 and 19 and the gap is represented by numeral 20.

Figure 2:
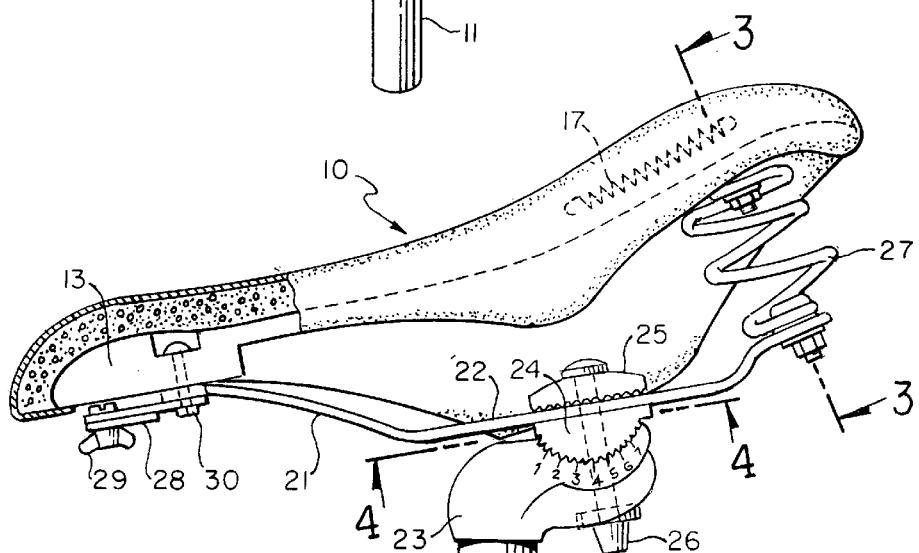
FIG. 2 is an enlarged side elevational view, partly in section, illustrating the seat shown in FIG. 1.

Referring now in detail to FIG. 2, it can be seen that the seat 10 includes a first or primary suspension system comprising a leaf spring 21 associated with each of the seat body halves or portions. Each of the leaf springs includes a midsection 22 separating the opposite ends of each leaf spring which is mounted to a pedestal or post base 23 by means of a clamp arrangement comprising a lower clamp bar 24 and an upper clamp bar 25. A securement bolt 26 secures the clamp arrangement on the pair of leaf springs and holds the seat onto the pedestal base 23. The angle of the seat with respect to the vertical axes of the pedestal or post 11 can be adjusted by aligning ridges and projections formed in both the base 23 and the undersurface of the lower clamp bar 24. The upper clamp bar 25 includes a serrated undersurface which engages with the top surface of the midsection of the leaf springs for securement purposes.

It can be seen that the rear ends of the leaf springs are attached to the back side of the seat by means of a coil spring 27 associated with each one of the leaf springs. Bolt and nut fastening means are employed for securing the coil spring to the leaf spring as well as to the underside of the back end of the seat. The front end of the seat is attached to the opposite end of each of the leaf springs by means of a width adjustment taking the form of a scissors linkage mechanism 28. The linkage mechanism is adjustably coupled between the front portions of each of the respective seat body portions for establishing a desired width between the opposing surfaces of the respective body portions. A wing nut fastener 29 secures the scissors linkage mechanism in a desired position when the proper distance or width between the front of the body portions has been established. The opposite ends of the linkage mechanism are fixedly secured respectively to each of the front portions of the body portions by fastening means 30.

Figure 3:
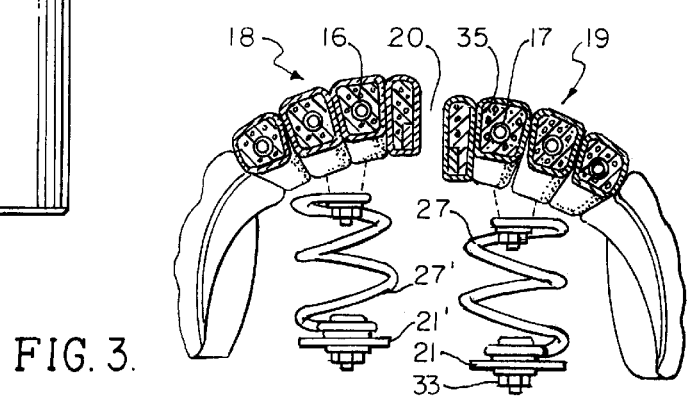
FIG. 3 is a transverse cross-sectional view of the seat as taken in the direction of arrows 3—3 of FIG. 2.

It can be seen that the secondary suspension system, illustrated by numeral 17, includes a plurality of helical springs occupying the respective pockets 14 and 15 of the respective seat portions 18 and 19. In FIG. 3, the suspension systems 16 and 17 are illustrated as being surrounded by cushion material, as indicated by numeral 35 with respect to the helical springs 17. Also, it can be seen that the body halves or portions 18 and 19 are spaced-apart by gap 20 and that they are independently movable with respect to each other. In this latter concern, the body half or portion 18 is at a different height than the height of the seat body portion 19. Such independent movement is permitted by the first or primary suspension system comprising the leaf springs 21 and coils 27.

Figure 4:
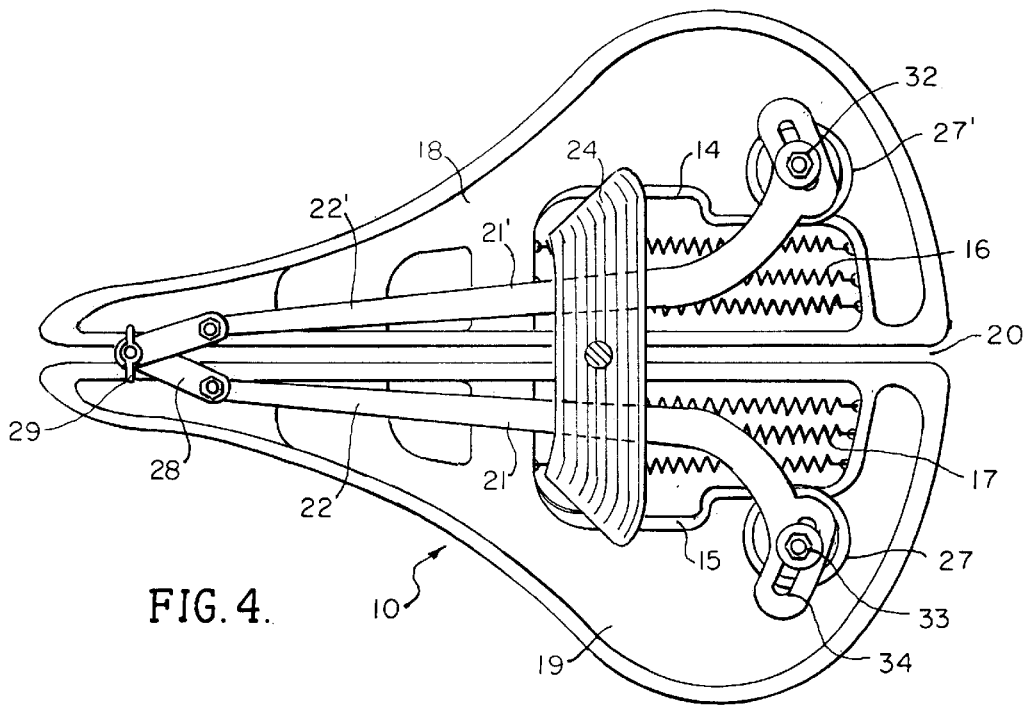
FIG. 4 is a bottom view of the seat shown in FIG. 2 as taken in the direction of arrows 4—4 thereof.

Referring now in detail to FIG. 4, it can be seen that the secondary suspension system 16 and 17 are included within pockets 14 and 15 of each one of the respective seat body halves or portions 18 and 19. The suspension system comprises a plurality of helical springs which have their opposite ends secured to opposite ends of each one of the respective pockets. The springs are arranged in spaced parallel relationship and the pockets are located critically so as to fit the skeletal portion of the user's torso.

FIG. 4 illustrates that the scissors linkage mechanism 28 will permit separation of the front of the seat to widen the gap 20 and the rear of the seat can be similarly widened by means of fasteners 32 and 33 which connect the rear of each of the leaf springs 21 and 21' to the end of coil 27 and coil 28'. The fasteners 32 and 33 are within a slot, such as slot 34, which permits the back of the seat to be widened.

Figure 5:
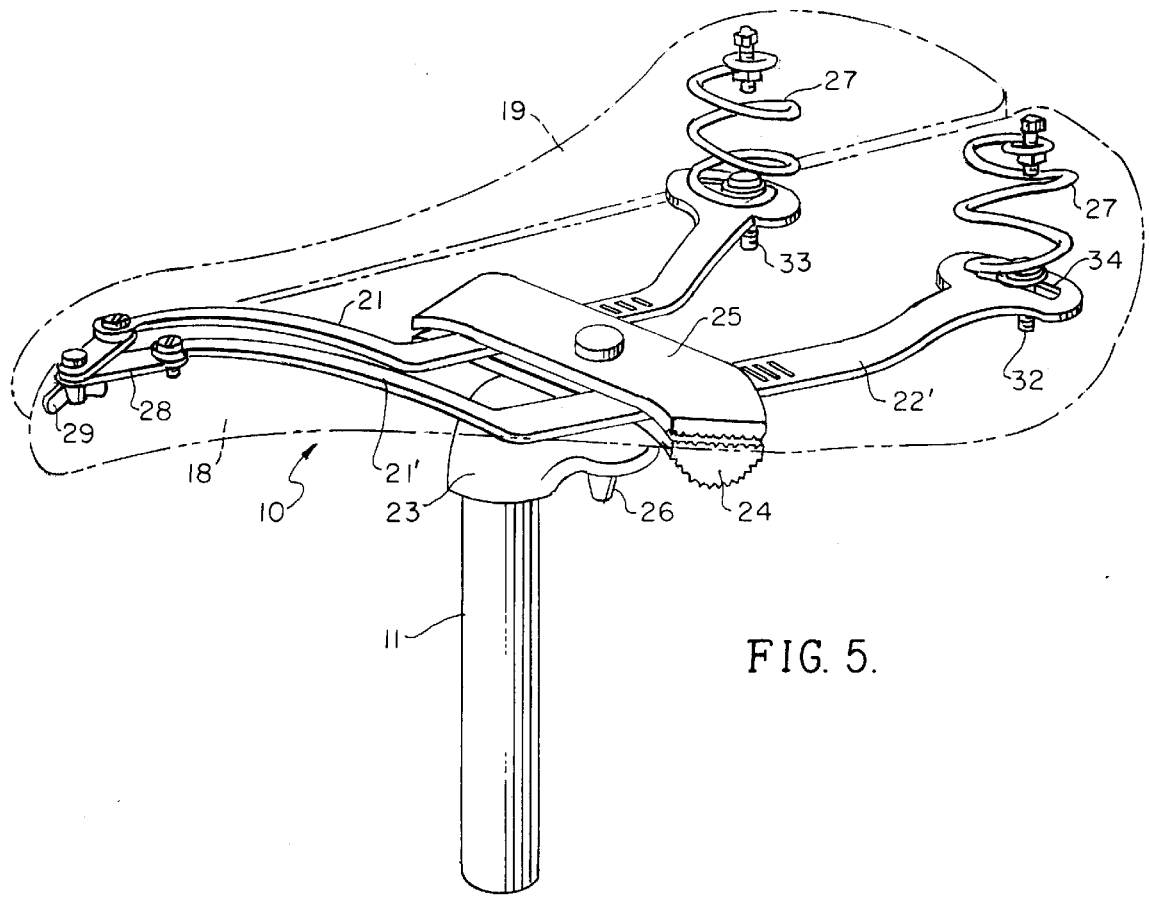
FIG. 5 is a perspective view illustrating the components of the seat shown in the above figures without the cushion and representing the primary or first suspension system.

Referring now in detail to FIG. 5, the primary suspension system is illustrated whereby the leaf springs 21 and 21' have their midsections 22 connected by means of the upper and lower clamp bars 24 and 25 to the base 23. The fastener 26 permits securement when the fore and aft location of the leaf springs has been selected. Also, it can be seen that the distance between the opposing surfaces of the seat halves or portions 18 and 19 may be separated to widen the gap 20 by means of the scissors linkage mechanism 28 and the slot and fastener arrangements represented by numerals 32 and 33.

The seat 10 is divided into two parts to allow each part or half of a full seat to function separately so as to accommodate leg motions and user size. This is achieved by using two independently movable seat portions wherein each portion or half includes a flat spring suspension system. Each flat leaf spring is arcuate shaped in cross-section and includes a midsection which is provided with raised small ribs that fit into mated notches on the clamp bar for both top and bottom. By sliding the leaf suspension forward or backwards within the clamp bars, bounce or flex is changed. Also, the leaf spring can be spread for width to give an angle width change that will accommodate a selected or desired size. The two rear coil springs 27 and 27' are mounted on the back of each of the leaf suspension springs and give added cushion and impact resistance. By moving the coil springs along slots 34, additional or less bounce and torque adjustment of the leaf spring can be provided as the coil springs are moved outwardly. The major purpose of adjusting the leaf springs is to position the leg/hip connection protrusion into the pocket 18 or 19 or each seat body portion which is designed to flex yet support the buttox portion of the user's body during varying motion.

Each seat half or body portion has its own three separately moving secondary spring system. The primary system composed of the leaf springs and the coil springs 27 and 27' are attached to a seat body at two points, such as at the front of the seat and one above the coil springs at the rear of the seat. A scissors linkage mechanism 28 is at the front of the seat for establishing width of gap 20 between the front of the seat body portions.

Splitting or dividing the seat 10 into a pair of body halves or portions is a major departure and advantage over the prior art. Whether the seat is employed for bicycling purposes or for use on exercise machines or the like, the basic support and suspension features are improved. Consequently, the present invention simultaneously addresses three major needs for improved seat with the simple tightening of fasteners. Positioning the desired adjustments and tightening are all that is needed to achieve these purposes. With respect to sizing or fit adjustment, the split or divided seat 10 is immediately size adjustable to fit different dimensioned and shaped individuals by spreading apart the necessary spacing and angle. The body portions or halves can be positioned to support the body at the required contact point. The contact points can then be designed to fit the predicted job it is to provide. One of the features would be to position exactly a pocket of coil suspension springs of a hammock type or style to allow the tendon muscle connection to the skeleton ample movement within the more flexible pocket. This is termed a secondary suspension system contained within the primary system formed by the leaf spring suspension and supports that hold the seat or saddle frame to the post.

The added flex and torque qualities of the flat spring provide more shock absporption than most other conventional seats. Additionally, this can be adjusted for body weight or shock reduction possibilities. It can be a harder or softer bounce, depending on personal requirement or road conditions. Settings can quickly adjust to rough off-road conditions or a smooth asphalt bicycle path.

Because there are two separately suspended seat halves or body portions, each half of portion is independently free to react to the different body functions imposed by the opposite leg pedalling motions produced. When one leg is in the extended downward thrust position, the corresponding seat half can follow the leg motion by depressing and torquing and giving minimal resistance of the seat; correspondingly, the opposite upward leg thrust is in a different position and is still properly supported by the independent acting of the other half of the seat. Each seat half or portion specializes in the required function and provides improved support and energy efficiency and comfort. Each seat half or portion can respond to the varying body positions as demanded. A single seat cannot efficiently do this and the split flexible seat and the two halves or portions are non-static and can anatomically compensate to varying body requirements.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An anatomically compensating seat comprising:

a cushioned seat body providing support for a user during physical procedure;

said seat body having at least two elongated body portions arranged in spaced-apart relationship separated by a seat longitudinal axis and each elongated body portion having a front end and a back end;

a pedestal;

an adjustable front and back tiltable mount for detachably securing said seat body portions to said pedestal;

suspension means resiliently mounting said seat body portions to said adjustable front and back tiltable mount allowing for independent movement of said seat body portions about said seat longitudinal axis;

said suspension means includes a leaf spring having opposite ends connected to each of said seat body portions and said leaf spring having an elongated midsection between said opposite ends adjustably carried on said adjustable front and back tiltable mount;

said adjustable front and back tiltable mount includes a base secured to said pedestal and a clamp arrangement adjustably carried on said base;

said leaf spring midsection of each of said leaf springs adjustably mounted on said clamp so as to be positioned to a selected front and back position with respect to said base;

said clamp arrangement includes an upper clamp bar and a lower clamp bar separated by said elongated midsections of said leaf springs;

said elongated midsections being normal with respect to said upper clamp bar and said lower clamp bar; and said base includes a semi-circular, concave irregular surface and said lower clamp bar having a semi-circular convex irregular surface matable with and adjustable with said base semi-circular, concave irregular surface.

2. The seat as defined in claim 1 wherein:

each elongated midsection of said leaf springs includes a serrated surface and said upper clamp bar includes a serrated surface adjustably engageable with said leaf spring serrated surfaces.

3. The seat as defined in claim 2 including:

a coil spring disposed between said back end of each of said leaf springs and said seat body portions.

4. The seat as defined in claim 3 including:

lateral width adjustment mechanism movably interconnecting said seat body portions for selecting a fixed width adjustment between said seat body portions.

5. The seat as defined in claim 4 wherein:

said width adjustment mechanism comprises a scissor linkage connecting said seat body portion front ends together; and securement means carried on said scissor linkage for releasably securing said scissor linkage in a selected position.

6. The seat as defined in claim 5 wherein:

each of said seat body portions includes a cushion pad extending the full length of said seat body portion and terminating at each of said back ends to define a pocket occupied by a plurality of helical springs; and said back end of said seat body portion constituting an aft section of said seat.

\* \* \* \* \*